US012754341B2

(12) United States Patent
Dai et al.

(10) Patent No.: US 12,754,341 B2
(45) Date of Patent: Oct. 6, 2026

(54) INTEGRITY EVALUATION OF NESTED TUBULARS OF A WELL SYSTEM USING AZIMUTHAL AND NON-AZIMUTHAL INFORMATION

(71) Applicant: Halliburton Energy Services, Inc., Houston, TX (US)

(72) Inventors: Junwen Dai, Houston, TX (US); Ahmed Fouda, Houston, TX (US); Huiwen Sheng, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 272 days.

(21) Appl. No.: 18/521,942

(22) Filed: Nov. 28, 2023

(65) Prior Publication Data

US 2025/0172716 A1 May 29, 2025

(51) Int. Cl.
*G01V 3/26* (2006.01)
*G06T 3/4007* (2024.01)

(52) U.S. Cl.
CPC .............. *G01V 3/26* (2013.01); *G06T 3/4007* (2013.01)

(58) Field of Classification Search
CPC ........................................................ G01V 3/26
See application file for complete search history.

(56) References Cited

U.S. PATENT DOCUMENTS 7,960,969 B2 6/2011 Mouget et al.
9,715,034 B2 7/2017 Omeragic et al.
9,983,173 B2 5/2018 Aslanyan et al.
10,087,738 B2 * 10/2018 Zhang .................. E21B 47/085
10,725,194 B2 7/2020 Fouda et al.
2018/0074220 A1 3/2018 David et al.

(Continued)

FOREIGN PATENT DOCUMENTS

WO 2018222209 12/2018
WO 2019-094209 5/2019

OTHER PUBLICATIONS

"PCT Application No. PCT/US2023/081477 International Search Report and Written Opinion", Aug. 14, 2024, 11 pages.

(Continued)

*Primary Examiner* — Walter L Lindsay, Jr.
*Assistant Examiner* — Milton Gonzalez
(74) *Attorney, Agent, or Firm* — DeLizio, Peacock, Lewin and Guerra, LLP

(57) ABSTRACT

Systems, methods, and apparatus, including computer programs encoded on computer-readable media, for integrity evaluation of one or more nested well tubulars of a well system are disclosed. One or more non-azimuthal logs and one or more azimuthal logs are acquired for the one or more nested well tubulars. The one or more non-azimuthal logs are processed to estimate at least one log of a circumferentially averaged attribute of the one or more nested well tubulars. The one or more azimuthal logs are processed in conjunction with the at least one log of the circumferentially averaged attribute to obtain at least one log of a non-circumferentially averaged attribute of the one or more nested well tubulars. The integrity of the one or more nested well tubulars is determined based, at least in part, on the log of the non-circumferentially averaged attribute of the one or more nested well tubulars.

20 Claims, 8 Drawing Sheets

(56) References Cited

U.S. PATENT DOCUMENTS

| | | | |
|---|---|---|---|
| 2019/0129057 A1 | 5/2019 | Fanini et al. | |
| 2022/0065094 A1 | 3/2022 | Hill, III et al. | |
| 2022/0178244 A1 | 6/2022 | Fouda et al. | |
| 2024/0384651 A1 * | 11/2024 | Ooi | E21B 47/085 |

OTHER PUBLICATIONS

Garcia, et al., "Successful Application of a New Electromagneitc Corrosion Tool for Well Integrity Evaluation in Old Wells Completed with Reduced Diameter Tubular", International Petroleum Conference, Jan. 1, 2013, 12 pages.

Haugland, "Fundamental Analysis of the Remote-Field Eddy-Current Effect", IEEE, Transactions on Magnetics, vol. 32 No. 4, Jul. 1996, pp. 3195-3211, Apr. 1, 1996, 17 pages.

* cited by examiner

INTEGRITY EVALUATION OF NESTED TUBULARS OF A WELL SYSTEM USING AZIMUTHAL AND NON-AZIMUTHAL INFORMATION

TECHNICAL FIELD

The present invention relates generally to oil and gas systems and services, and more specifically to integrity evaluation of nested tubulars of a well system using azimuthal and non-azimuthal information.

BACKGROUND

The oil and gas services industry uses various types of downhole well devices or tools in well systems. For example, well systems may use well devices or tools to determine the depth within a wellbore and to evaluate the integrity of nested tubulars of the well system, such as nested production tubing and casing. Early detection of metal loss of well components, like production tubing or casing, is of great importance to oil and gas well operators and management. Currently, electromagnetic (EM) tools, such as remote field eddy current tools, can detect anomalies on multiple nested tubulars. However, this type of tool has low vertical resolution and provides no azimuthal information, which means the estimated metal loss result provided by the tool is an average value of annular section of the pipe within the tool vertical resolution range. Therefore, the tool may fail to detect tubular flaws, such as cracks, pitting, holes, and any metal loss due to corrosion, which may result in expensive remedial actions and shut down of production wells. Besides the lower resolution EM tools, some corrosion tools with high resolution and circumferential information may be used. These tools may include magnetic flux leakage tools, acoustic tools, and mechanical caliper tools, among others. But these high-resolution, corrosion tools are usually used on-contact with the pipes or tubulars, which means the tools only analyze one pipe or tubular at a time. When the well system has multiple nested well tubulars, the operator may have to pull pipes out of the well for monitoring, which introduces risks and down time for the well.

DESCRIPTION

The description that follows includes example systems, methods, techniques, and program flows that describe aspects of the disclosure. However, it is understood that this disclosure may be practiced without these specific details. For instance, this disclosure refers to certain well devices or tools in illustrative examples. Aspects of this disclosure can be instead applied to other types of well devices and tools. In other instances, well-known instruction instances, protocols, structures, and techniques have not been shown in detail to avoid confusion.

Figure 1:
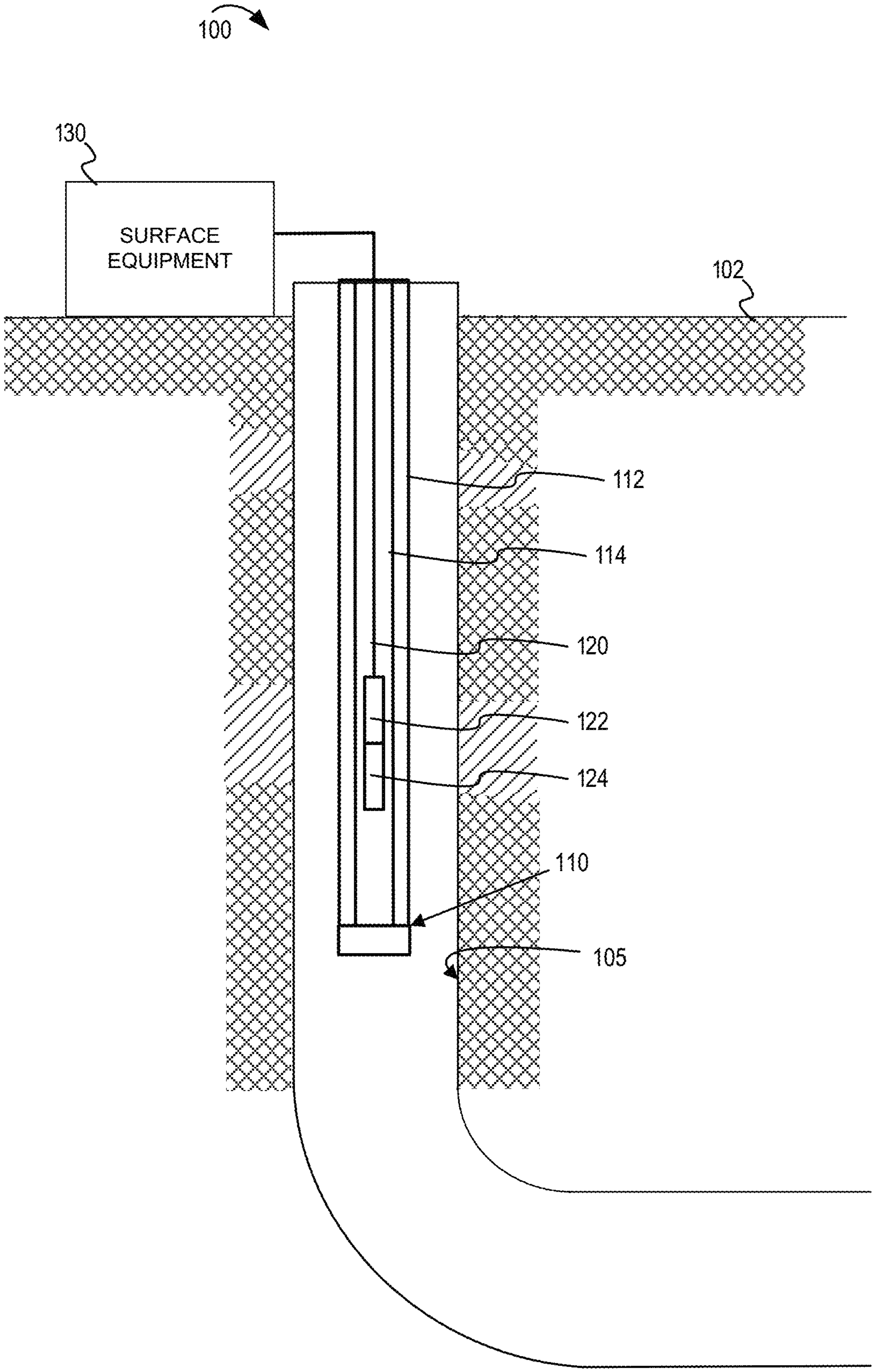
FIG. 1 depicts a schematic diagram of an example well system and well tools that may be used for integrity evaluation of nested well tubulars, according to some implementations.

FIG. 1 depicts a schematic diagram of an example well system and well tools that may be used for integrity evaluation of nested well tubulars, according to some implementations. In some implementations, the well system 100 may include a two or more nested tubulars or concentric tubes. In the non-limiting example shown in FIG. 1, the well system 100 may include three nested tubulars, such as a casing 105, a first well tube 112, and a second well tube 114. In one example, the first well tube 112 and the second well tube 114 may be concentric tubulars of a work string 110. In another example, the first well tube 112 may be a second casing and the second well tube 114 may be a work string. It is noted, however, that the well system 100 shown in FIG. 1 is just an example, and the well system 100 may have any number of nested tubulars, such as two nested tubulars, or more than 4 nested tubulars.

In some implementations, the well system 100 may include a first well tool 122 and a second well tool 124 for taking integrity measurements to perform integrity evaluation of the nested tubulars. In some implementations, the first well tool 122 may be an electromagnetic (EM) tool, such as an eddy current tool, that can take integrity measurements on multiple nested tubulars. The second well tool 124 may be one of the following: a flux leakage tool, an ultrasonic tool, or a mechanical caliper tool, among others. For example, the second well tool 124 may be one of the following: a multi-arm caliper tool, a multi-arm or scanning ultrasound sensor tool, a magnetic flux leakage tool, a partial saturation eddy current tool, or multi-sensor or scanning eddy current tool, among others. In some implementations, one or both of the well tools 122 and 124 may be lowered into the nested tubulars using a wireline 120. It is noted, however, that in other implementations one or both of the well tools 122 and 124 may be lowered into the nested tubulars by other mechanisms. In some implementations, the well tools 122 and 124 may take integrity measurements and may provide the measurements to surface equipment 130 at the surface 102 (such as one or more computer systems) to perform the integrity evaluation of the nested tubulars. In some implementations, the processing of the integrity measurements may be performed by the surface equipment 130 at the surface 102. In some implementations, some of the processing of the integrity measurements may be performed by the surface equipment 130, and some of the processing of the integrity measurements may be performed downhole by the well tools 122 and 124 or by other downhole well devices. By using both the first well tool 122 and the second well tool 124 to take different sets of integrity measurements and processing (and combining) the different sets of integrity measurements (as further described below), the well system 100 can qualitatively inspect the integrity of multiple nested tubulars with azimuthal resolution.

In some implementations, the first well tool 122 may perform omni-directional, EM logging on multiple nested well tubulars to take measurements that can be used to generate at least one non-azimuthal log. The first well tool 122 may also be referred to as an EM tool or a non-azimuthal tool. The second well tool 124 may perform azimuthal logging to obtain circumferential information and measurements that can be used to generate at least one azimuthal log. The second well tool 124 may also be referred to as a high-resolution tool or an azimuthal tool. In some implementations, the well system 100 may generate a detailed geometric description of a defect in one or more nested well tubulars with high resolution by combining the azimuthal log with the non-azimuthal log, as further described below in FIGS. 2-6. For example, the surface equipment 130 of the well system 100 may combine a qualitative azimuthal image of the azimuthal log with the omni-directional EM logging of the non-azimuthal log. In some implementations, the well system 100 may also recommend remedial actions to the operator of the well system 100.

Monitoring the condition of the casing, work strings, and other nested well tubulars is important in oil and gas field operations. EM techniques may be used for inspection of the nested well tubulars. To acquire a stronger response from the outer pipes of the nested tubulars, typically, a larger transmitter coil is employed together with larger receiver coils that are placed at large distances away from the transmitter (with low frequency excitation). However, such measurements may degrade the vertical (i.e., along the direction of the depth) resolution in the thickness estimation results. Since omnidirectional coils can be used, measurements made by such tools may lack any directional sensitivity. On the other hand, there are some corrosion tools that are used on casing and tubular inspection that have a very high resolution and circumferential information. These tools can be flux leakage tools, ultrasonic tools, and mechanical caliper tools, among others, that typically analyze a single (immediate) pipe only at each logging. This may result in the operator pulling pipes out from the well and thus introduces additional risks for the well operation and increases the down time for the well. The integrity evaluation techniques described herein combine the non-azimuthal logs and the azimuthal logs (as further described below) to monitor corrosion in multiple tubulars with higher resolution and without having to pull pipes from the well.

Figure 2:
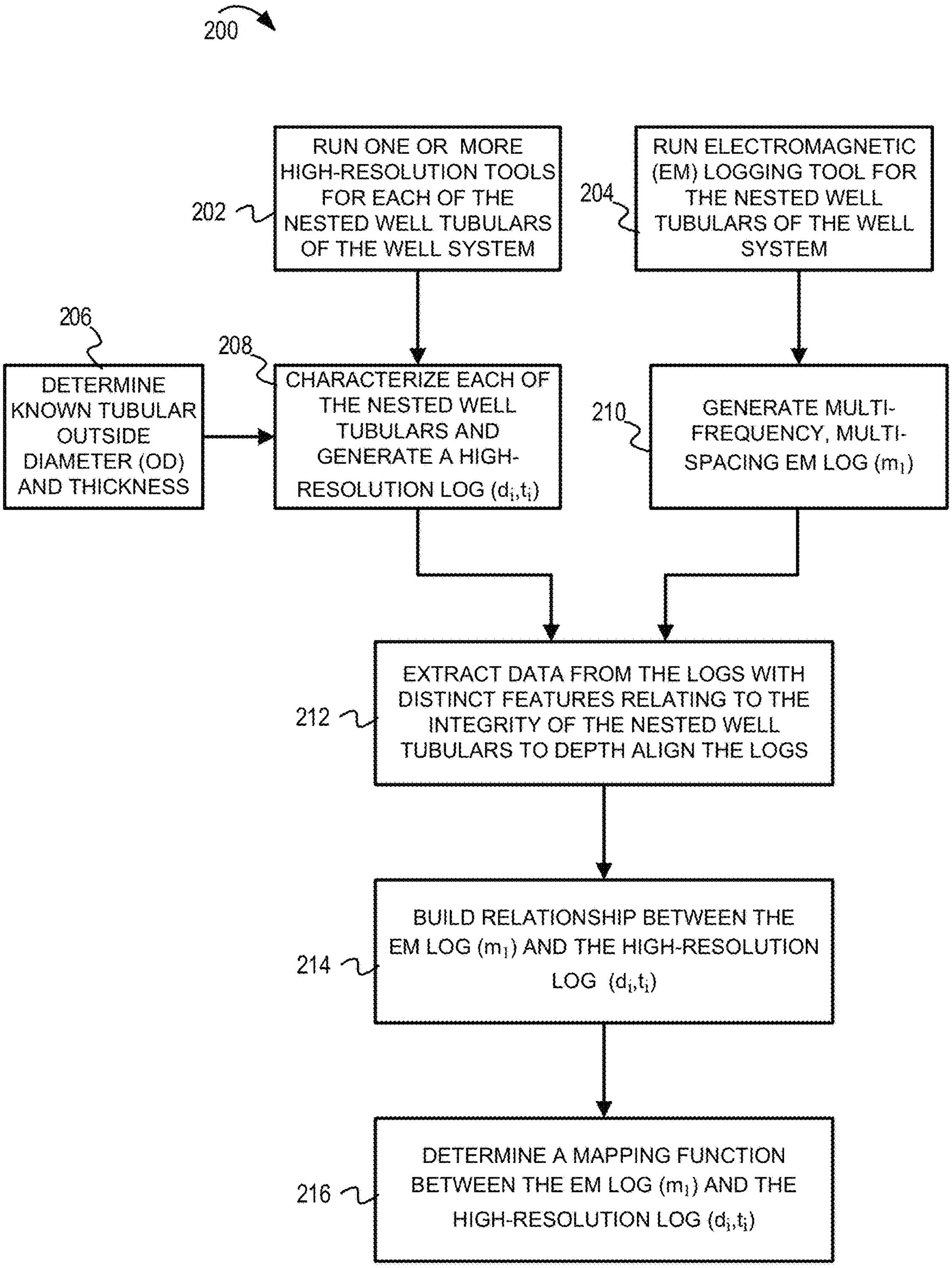
FIG. 2 is a flowchart of example operations for obtaining integrity measurements and performing integrity evaluation of nested well tubulars of a well system, according to some implementations.

FIG. 2 is a flowchart 200 of example operations for obtaining integrity measurements and performing integrity evaluation of nested well tubulars of a well system, according to some implementations. In some implementations, the integrity evaluation technique performed by the well system may combine an EM log (which may be referred to as a non-azimuthal log) obtained from an EM tool and azimuthal measurements (which may be referred to as an azimuthal log) obtained from a high-resolution tool to provide a detailed map for all nested well tubulars. As further described below and in the flowchart 200, the integrity evaluation using the detailed map for all of the nested well tubulars may be accomplished by a mapping process that relates the EM log and the high-resolution measurements. After obtaining mapping information (such as a mapping function) for a well system, the mapping function may be used to predict nested well tubular information with better resolution using only the EM log and the mapping information, as further described in FIG. 4.

In some implementations, a well system (such as the well system 100 shown in FIG. 1) can run one or more high-resolution tools (block 202), such as the second well tool 124 described in FIG. 1, and run an EM logging tool (block 204), such as the first well tool 122 described in FIG. 1, for the nested well tubulars of the well system. While running the one or more high-resolution tools on each of the nested well tubulars, the well system can generate one or more azimuthal logs (including one or more azimuthal images) from measurements taken by the high-resolution tools. For example, a qualitative azimuthal image can be obtained from a magnetic flux leakage tool, an acoustic tool, a mechanical caliper, or azimuthal EM images (shallow, medium, deep). A combination of azimuthal images from different physics can be used. In some implementations, the well system may determine the known tubular outside diameter (OD) and thickness of each of the nested well tubulars (block 206). The well system may characterize each of the nested well tubulars based on the known tubular information and the high-resolution measurements. For example, a computer system or surface equipment of the well system may characterize each of the nested well tubulars based on the known tubular information and the high-resolution measurements. In some implementations, the well system may generate or obtain the azimuthal log (or the high-resolution log) ($d_i$, $t_i$) by characterizing each of the nested well tubulars based on the known tubular information and the high-resolution measurements (block 208).

Figure 3:
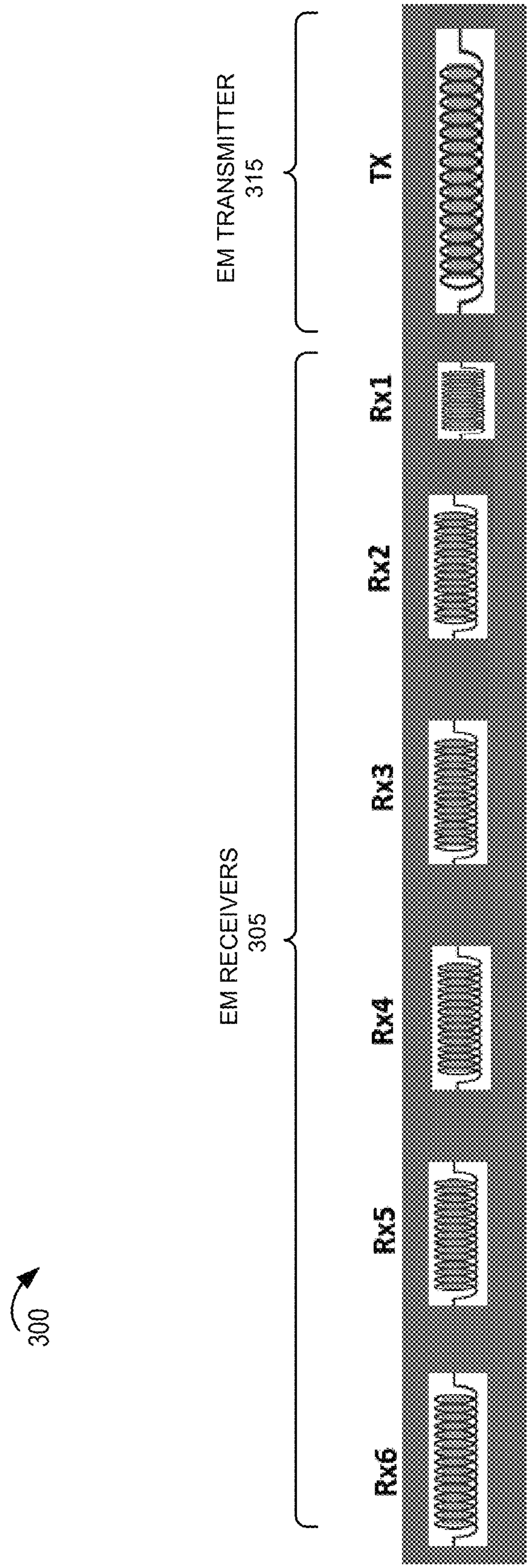
FIG. 3 depicts a schematic diagram of an example electromagnetic logging tool, according to some implementations.

In some implementations, the well system may run the EM logging tool or EM pipe inspection tool to obtain at least one multi-frequency and multi-spacing EM log ($m_1$) (block 210). The well system may run the EM logging tool without removing any casing or pipes. In some implementations, an EM logging tool 300 may include one or more EM transmitters 315 and one or more EM receivers 305, as shown in FIG. 3. The EM logging tool may acquire measurements in frequency or time domains. EM logging techniques, such as eddy current techniques, allow for multiple pipes characterizations (i.e., nested well tubular characterization). Different depths of penetration and vertical resolutions may be achieved via one EM transmitter 315 and several EM receivers 305 placed at various distances from the EM transmitter 315. In some implementations, the EM receivers 305 that are shorter and smaller (compared to other EM receivers) may be placed at a shorter distance from the EM transmitter 315, and can measure the response due to the inner pipes or tubulars (of the nested well tubulars) with better vertical resolution. The EM receivers 305 that are longer and larger in size (compared to other EM receivers) can be placed at longer distances from the EM transmitter 315, and can measure responses of all the pipes or tubulars. Thus, in some implementations, the EM log (or non-azimuthal log) may be processed to invert all casing information with one run.

Returning to FIG. 2, in some implementations, after obtaining the azimuthal log and the non-azimuthal log, the well system may extract data from the logs with distinct features relating to the integrity of the nested well tubulars to depth align the logs (block 212). For example, a computer system or surface equipment of the well system may extract data from the logs with distinct features relating to the integrity of the nested well tubulars. In order to match the azimuthal log and the non-azimuthal log, the logs may be depth aligned or depth matched based on the distinct features, such as distinct features in pipe thickness or electrical properties (or other features) that can be matched in both logs. Depth aligning or depth matching is the practice of shifting depths of various data sets to a measurement that is known to be on depth. The goal is to align the depth of the non-azimuthal log (i.e., EM log) and the azimuthal log (i.e., the high-resolution log). In some implementations, one of the logs is designated or labelled as the reference log, and the other log is designated or labelled as the target log. The logs may be aligned according to their depth together based on time wrapping and cross-correlation or supervised machine learning techniques. In some implementations, a third log (i.e., a different log than the azimuthal and non-azimuthal logs) may be used as the reference log, and both the azimuthal log and the non-azimuthal log are processed to align the depth to the reference log (the third log).

In some implementations, the well system may build a relationship between the EM log ($m_1$) (i.e., the non-azimuthal log) and the high-resolution log) ($d_i$, $t_i$) (i.e., the azimuthal log) (block 214). In some implementations, the well system may determine a mapping (e.g., a mapping function or other mapping information) between the EM log ($m_1$) and the high-resolution log) ($d_i$, $t_i$) (block 216) For example, a computer system or surface equipment of the well system may determine the mapping between the EM log ($m_1$) and the high-resolution log) ($d_i$, $t_i$). In some implementations, the well system may process the non-azimuthal log to estimate the log of circumferentially averaged attribute of the nested well tubulars. The circumferentially averaged attribute may include one of the following: the individual circumferentially averaged thickness or metal loss of each one of the tubulars, the individual circumferentially averaged magnetic permeability and/or electrical conductivity of each one of the tubulars, the cumulative thickness or metal loss of the tubulars, or the eccentricity between tubulars. In some implementations, the well system may process the azimuthal log in conjunction with the log of circumferentially averaged attribute, which may include computing at least one scaled image. The scaled image may be a scaled version of the azimuthal log (or multiple azimuthal logs) such that the circumferential average equivalent of the scaled image at any given depth matches the log of circumferentially averaged attribute at that depth. In some implementations, the circumferential average equivalent of the scaled image may be computed as a weighted sum of the scaled image pixels within a sliding window with an axial length proportional to the vertical resolution of the EM logging tool. In some implementations, the log of non-circumferentially averaged attributes is a quantitative two-dimensional image of the individual attributes of each one of the nested well tubulars. In some implementations, the well system computing the scaled image may include solving an optimization problem to determine the contrast of each pixel.

In some implementations, the well system may perform a constrained optimization to satisfy both the average thickness constraint and the contrast constraint, as shown in Equation 1 below. The relative importance of the two constraints can be adjusted using a hyperparameter, such as the $\lambda_1$ and $\lambda_2$ shown in Equation 1. The processing may be applied to the entire data or in selected zones identified based on metal loss from the thickness curve part of a qualitative azimuthal image. This may be achieved using a model-based inversion or a supervised machine learning model. In one example of a model-based inversion approach, the estimation of the pipe thickness of each pixel can be solved by finding the model parameters that minimize the cost function. The cost function used in the inversion may contain three terms: the proportion misfit, the average pipe thickness misfit, and the regularization term to penalize solutions which are far beyond the nominal pipe thickness. Equation 1 is an example of the cost function, F(x). In some implementations, solving the inverse problem involves finding the model parameters that minimize the cost function in Equation 1. In some implementations, this may be accomplished using an iterative, non-linear numerical optimization algorithm. In some implementations, this may also be solved using a linear model.

$$F(x) = \left\| \frac{x}{t_{nom}} - \frac{m(x)}{m_{nom}} \right\|_2^2 + \lambda_1 \|x_{avg} - t_{avg}\|_2^2 + \lambda_2 \|x - t_{nom}\|_2^2 \quad \text{(Equation 1)}$$

Where: x: vector of N (unknown) model parameters;

$x=[t_1, \ldots, t_{N_p}]$, $N_p$ is the number of all pixels of pipe thickness; $t_i$ denotes the pipe thickness of $i^{th}$ pixel.

$t_{nom}$ is the nominal pipe thickness.

$m(x)=[m_1, \ldots, m_{N_p}]$ is the measured quality (can be pipe thickness, signal strength) from the omni-directional log.

$m_{nom}$ is the nominal quantity of the omni-directional log.

$x_{avg}$ is the average estimated pipe thickness of a given window with a given size.

$t_{avg}$ is the average pipe thickness (from the EM log) of a given window with a given size.

Figure 4:
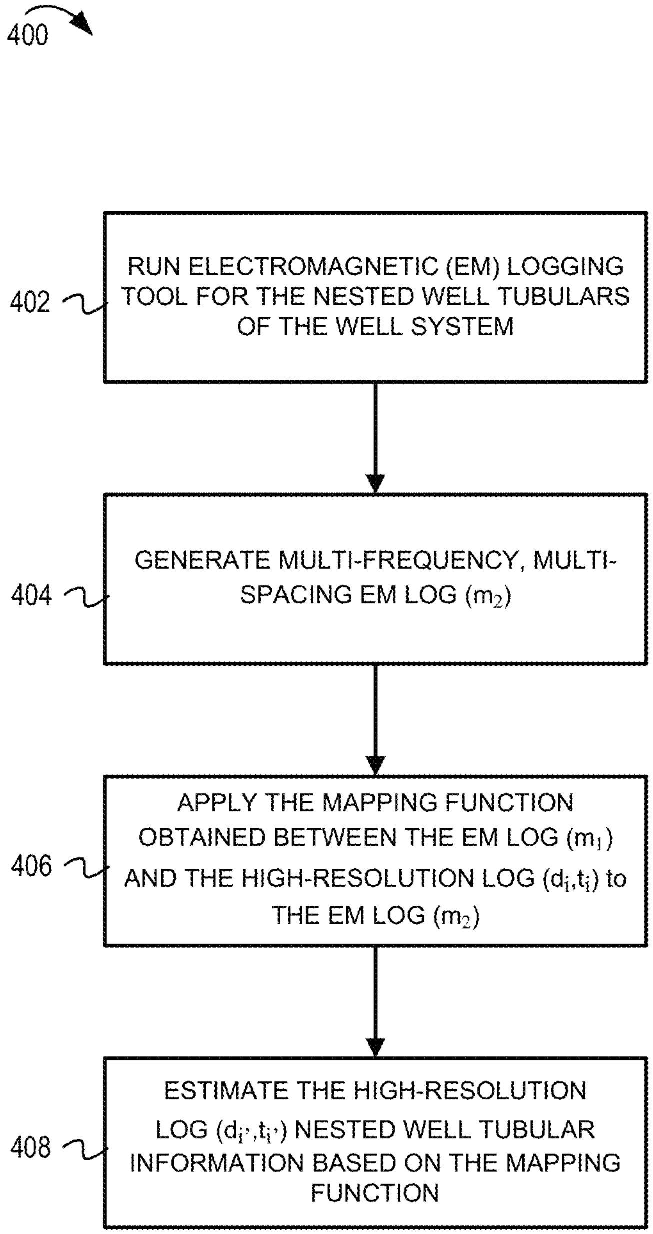
FIG. 4 is a flowchart of example operations for using mapping information to perform integrity evaluation of nested well tubulars of a well system, according to some implementations.

FIG. 4 is a flowchart 400 of example operations for using mapping information to perform integrity evaluation of nested well tubulars of a well system, according to some implementations. In some implementations, after obtaining mapping information (such as a mapping function) for a well system (as described above in FIG. 2), the mapping function may be used to predict nested well tubular information with better resolution using only the EM log and the mapping information.

In some implementations, a well system (such as the well system 100 shown in FIG. 1) can run an EM logging tool (block 402), such as the first well tool 122 described in FIG. 1, for the nested well tubulars of the well system. In some implementations, the well system may run the EM logging tool (or EM pipe inspection tool) to obtain at least one multi-frequency and multi-spacing EM log ($m_2$) (block 404). In some implementations, the well system may apply the mapping function obtained between the EM log ($m_1$) and the high-resolution log ($d_i$, $t_i$), as described in FIG. 2, to the EM log ($m_2$) (block 406). In some implementations, the well system may estimate the high-resolution log ($d_i'$, $t_i'$) nested well tubular information based on the mapping function (block 408). For example, the high-resolution log ($d_i$, $t_i$) nested well tubular information may be nested well tubular parameters such as pipe thickness. Thus, after obtaining the mapping function from the EM log ($m_1$) and the high-resolution log ($d_i$, $t_i$), as described in FIG. 2, the operator of the well system only has to run the EM logging tool in subsequent well integrity evaluations to obtain an updated EM log (e.g., the EM log ($m_2$)) since the updated high-resolution nested well tubular information for the well system can be estimated using the mapping function.

Figure 5:
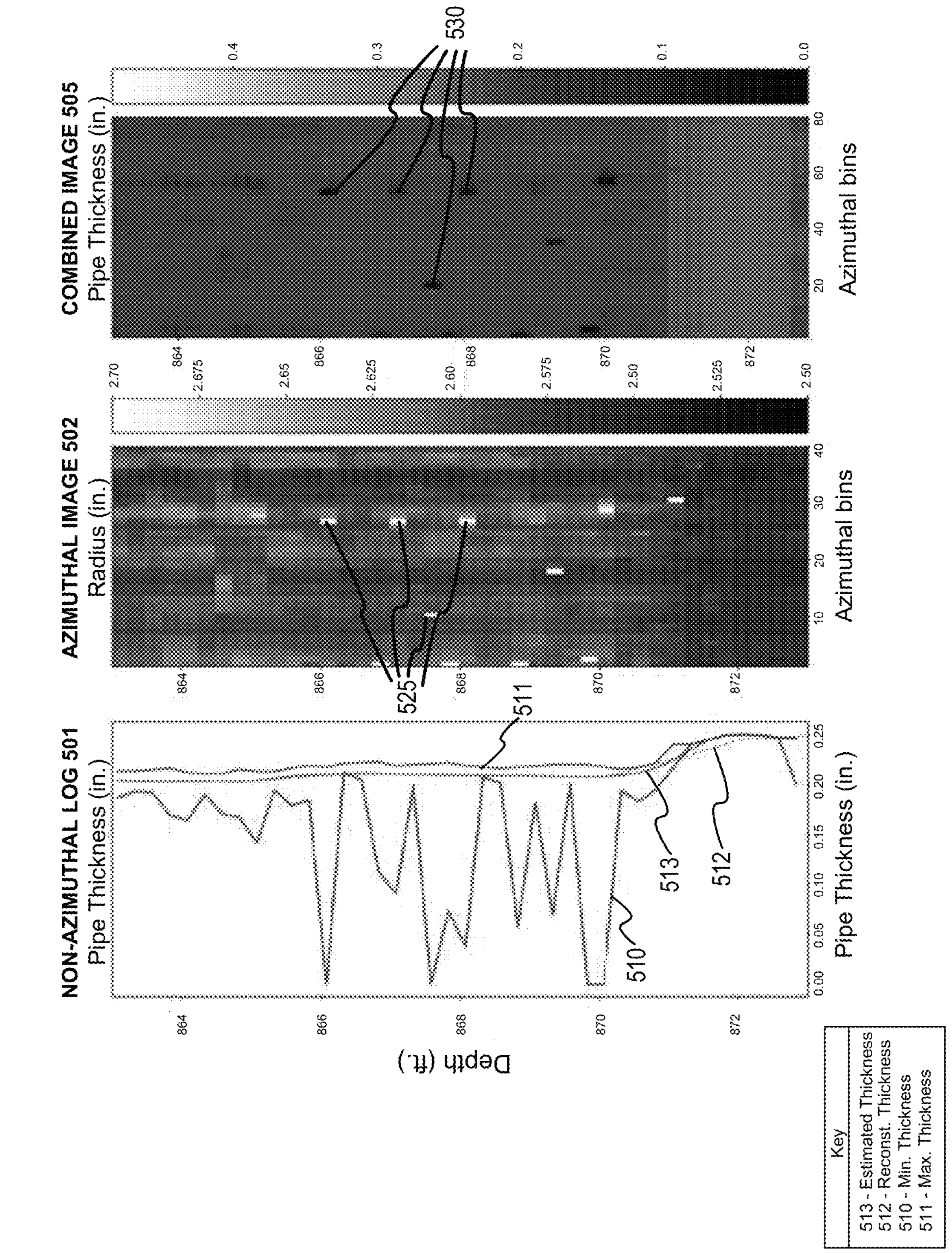
FIG. 5 illustrates an example integrity evaluation result using the mapping function and the EM log information, according to some implementations.

FIG. 5 illustrates an example integrity evaluation result using the mapping function and the EM log information, according to some implementations. In some implementations, time-lapse logs of pipe thickness of the nested well tubulars may be acquired. The time-lapse logs may be processed using the initial azimuthal image 502. The generated time-lapse image of the pipe thickness may show the evolution of metal loss over time. In some implementations, the initial image of the pipe thickness may be used as an upper bound in the time-lapse processing. FIG. 5 shows an example of combining the azimuthal log (e.g., the azimuthal image 502) and the non-azimuthal log 501 to generate a combined image 505 to have better interpretation for the integrity of the nested well tubulars. By inverting the EM log, we can estimate the pipe thickness of the nested well tubulars, as shown by the estimated thickness plot line 513 in the non-azimuthal log 501 (i.e., the EM log). The non-azimuthal log 501 also shows a min. thickness plot line 510, a max. thickness plot line 511, and a reconst. thickness plot line 512 for various depths. However, in the non-azimuthal log 501, the estimated thickness is an averaged value of each depth. The non-azimuthal log 501 does not show detailed features, like pitch or holes/perforations. The azimuthal image 502 (i.e., the azimuthal log or high-resolution log) does show detailed features for various depths and azimuthal bits, such as several perforations 525. Based on the azimuthal measurement, the logs can be combined and the estimated pipe thickness can be apportioned for the azimuthal direction. The combined image 505 may be generated by combining both logs, and shows the pipe thickness, depth and azimuthal bins, including perforations 530 that correspond to the perforations 525. The detailed features can be observed from the combined image 505 with the azimuthal information. It is noted that FIG. 5 shows one example technique and result of combining the azimuthal and non-azimuthal logs and images, and in other examples multiple logs may be used for multiple pipe integrity evaluation.

Figure 6:
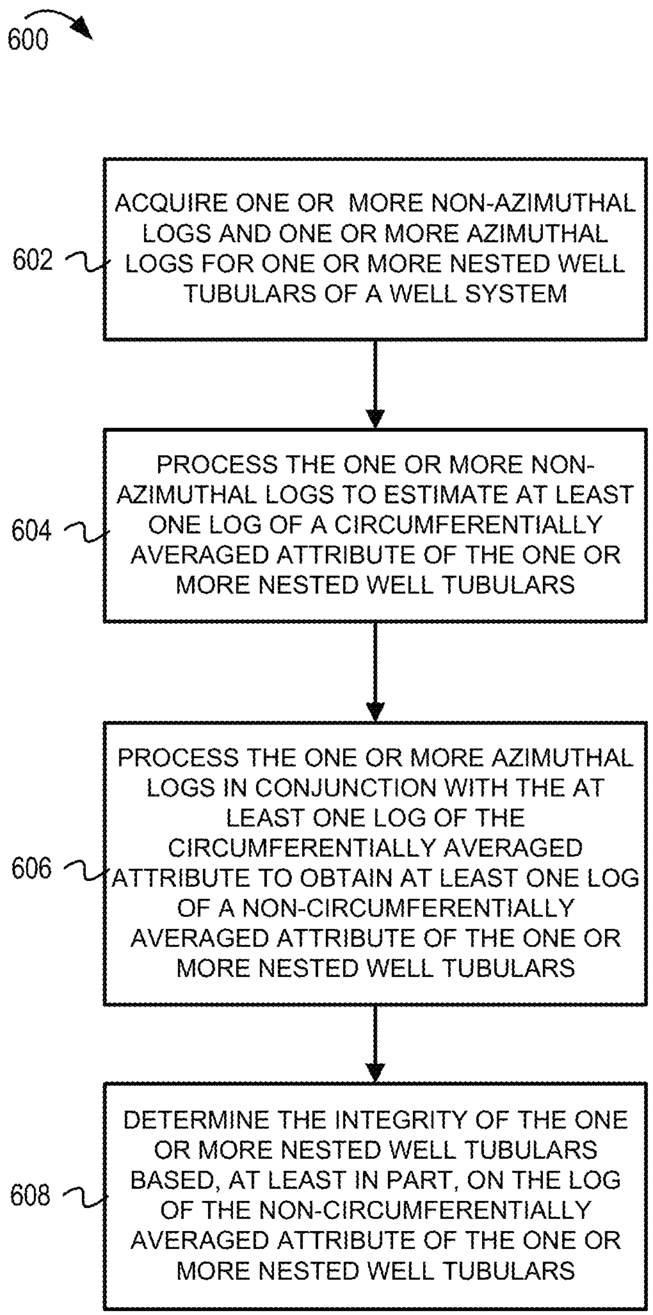
FIG. 6 is a flowchart of example operations for processing one or more non-azimuthal logs and one or more azimuthal logs to perform integrity evaluation of nested well tubulars of a well system, according to some implementations.

FIG. 6 is a flowchart 600 of example operations for processing one or more non-azimuthal logs and one or more azimuthal logs to perform integrity evaluation of nested well tubulars of a well system, according to some implementations. In some implementations, one or more non-azimuthal logs and one or more azimuthal logs may be acquired for the one or more nested well tubulars (block 602). For example, a non-azimuthal well tool (such as an EM well tool) may acquire the one or more non-azimuthal logs, and an azimuthal well tool (such as a high-resolution well tool) may acquire the one or more azimuthal logs. In some implementations, the one or more non-azimuthal logs are processed to estimate at least one log of a circumferentially averaged attribute of the one or more nested well tubulars (block 604). In some implementations, the one or more azimuthal logs are processed in conjunction with the at least one log of the circumferentially averaged attribute to obtain at least one log of a non-circumferentially averaged attribute of the one or more nested well tubulars (block 606). In some implementations, the integrity of the one or more nested well tubulars is determined based, at least in part, on the log of the non-circumferentially averaged attribute of the one or more nested well tubulars (block 608).

In some implementations, processing the one or more non-azimuthal logs to estimate the at least one log of the circumferentially averaged attribute of the one or more nested well tubulars may include running a model-based inversion or a supervised machine learning model. In some implementations, the circumferentially averaged attribute may include at least one of a circumferentially averaged thickness of each of the one or more nested well tubulars, a circumferentially averaged metal loss of each of the one or more nested well tubulars, a circumferentially averaged magnetic permeability of each of the one or more nested well tubulars, a circumferentially averaged electrical conductivity of each of the one or more nested well tubulars, a cumulative thickness the one or more nested well tubulars, a cumulative metal loss of the one or more nested well tubulars, and an eccentricity between the one or more nested well tubulars. In some implementations, processing the one or more azimuthal logs in conjunction with the at least one log of the circumferentially averaged attribute may include generating at least one scaled image. The scaled image may be a scaled version of the one or more azimuthal logs such that a circumferential average equivalent of the scaled image at a given depth matches the at least one log of the circumferentially averaged attribute at the given depth.

In some implementations, the circumferential average equivalent of the scaled image may be computed as a weighted sum of pixels of the scaled image within a sliding window with an axial length proportional to a vertical resolution of a non-azimuthal tool that acquired the one or more non-azimuthal logs. In some implementations, the scaling for the scaled image is a linear scaling, a polynomial scaling, or a non-linear scaling. In some implementations, generating the scaled image may include performing an optimization operation to determine a contrast of each pixel of the scaled image. In some implementations, the at least one log of the circumferentially averaged attribute may include multiple logs (or a plurality of logs) of the circumferentially averaged attribute for each of the one or more nested well tubulars. The plurality of logs of the circumferentially averaged attribute for each of the one or more nested well tubulars may be used to obtain scaled images for each of the one or more nested well tubulars. In some implementations, the one or more azimuthal logs may include a plurality of azimuthal logs with different depth of investigation. The plurality of azimuthal logs with different depth of investigation may be used for generating scaled images for each of the one or more nested well tubulars.

In some implementations, the one or more non-azimuthal logs and the one or more azimuthal logs may be depth aligned. In some implementations, the at least one log of the non-circumferentially averaged attributes may be a quantitative two-dimensional image of one or more attributes of each of the one or more nested well tubulars. In some implementations, a mapping function may be determined between the one or more azimuthal logs and the one or more non-azimuthal logs for the one or more nested well tubulars. One or more additional non-azimuthal logs for the one or more nested well tubulars may be acquired. Azimuthal information may be estimated for the one or more nested well tubulars to combine with the one or more additional non-azimuthal logs based on the mapping function. In some implementations, acquiring the one or more non-azimuthal logs may include logging the well system with an eddy current tool with multiple depths of investigation, and acquiring the one or more azimuthal logs may include logging the well system with at least one of a multi-arm caliper tool, a multi-arm or scanning ultrasound sensor tool, a magnetic flux leakage tool, a partial saturation eddy current tool, and a multi-sensor or scanning eddy current tool.

Figure 7:
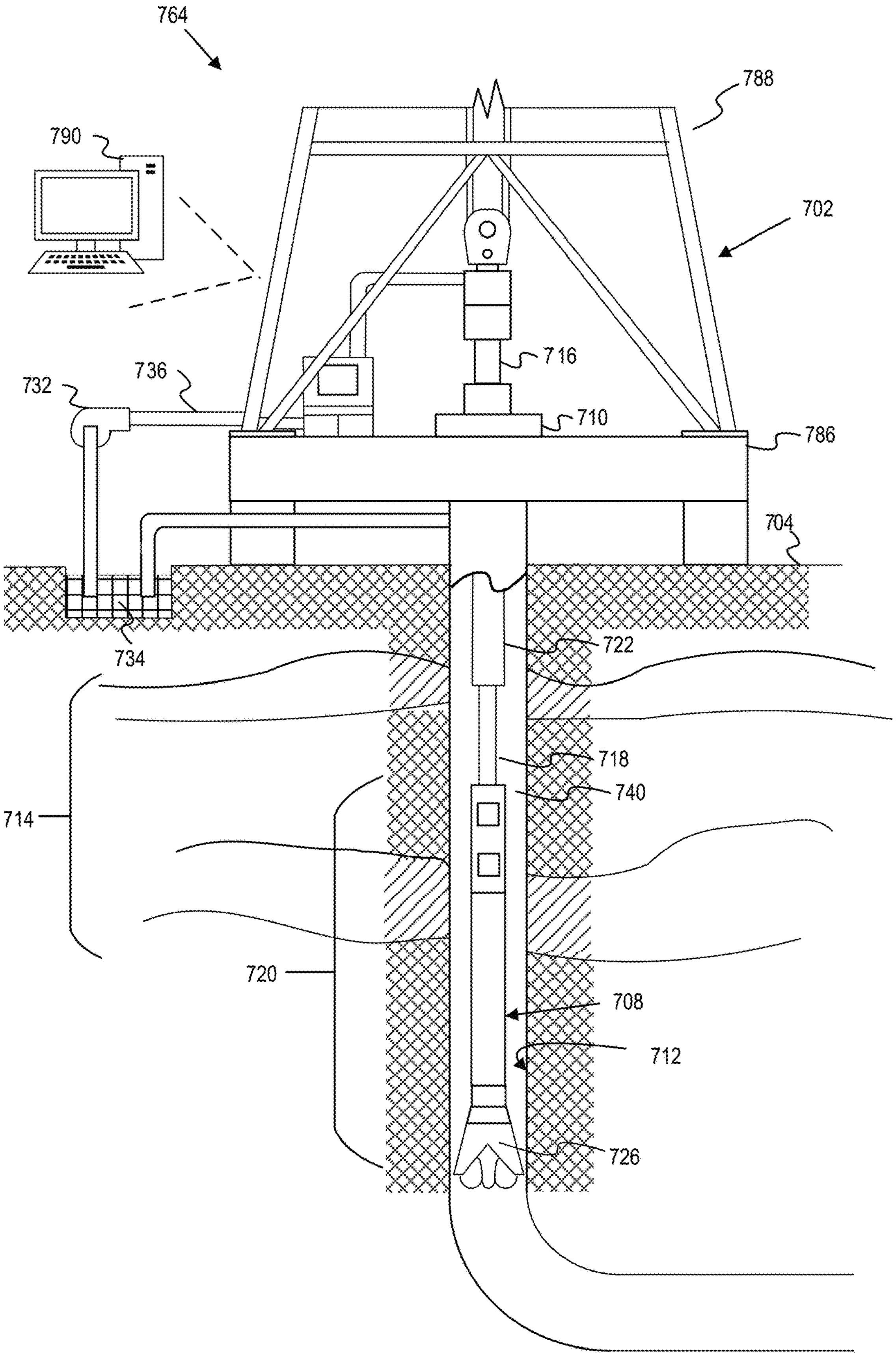
FIG. 7 is a schematic diagram of a drilling rig system as an example of oil services systems that use surface and downhole equipment, according to some implementations.

FIG. 7 is a schematic diagram of a drilling rig system as an example of oil services systems that use surface and downhole equipment, according to some implementations. For example, in FIG. 7 it can be seen how a system 764 may also form a portion of a drilling rig 702 located at the surface 704 of a well. It is noted that while drilling system 764 may be illustrated as land-based, the present techniques may also be applicable in offshore applications. Drilling of oil and gas wells is commonly carried out using a string of drill pipes connected together so as to form a drilling string 708 that may be lowered through a rotary table 710 into a borehole 712. Here a drilling platform 786 may be equipped with a derrick 788 that supports a hoist. In some implementations, a wireline (such as the wireline 120 shown in FIG. 1) or other mechanism may be used to lower one or more well tools (such as the well tools 122 and 124 shown in FIG. 1) into the well to perform integrity measurements in order to evaluate the integrity of nested well tubulars of the system 764 (as described above in FIGS. 1-6). For example, after performing drilling operations, the well tools may be lowered into the well to perform an integrity evaluation on one or more nested well tubulars, such as one or more casings of the well, the one or more pipes of a work string or drill string, and other tubulars of the system 764. A computer system 790 may be communicatively coupled to any sensors and control devices attached to surface equipment or to the downhole equipment (e.g., downhole well devices and downhole well tools) of the system 764. For example, the computer system 790 may be communicatively coupled to well tools that perform the integrity evaluation of the nested well tubulars via a wireline as shown in FIG. 1 and described above in FIGS. 1-6.

The drilling rig 702 may provide support for the drill string 708. The drill string 708 may operate to penetrate the rotary table 710 for drilling the borehole 712 through subsurface formations 714. The drill string 708 may include a Kelly 716, drill pipe 718, and a bottom hole assembly 720, perhaps located at the lower portion of the drill pipe 718.

The bottom hole assembly 720 may include drill collars 722, one or more downhole tools, and a drill bit 726. The drill bit 726 may operate to create a borehole 712 by penetrating the surface 704 and subsurface formations 714. The one or more additional downhole tools may comprise any of a number of different types of tools including MWD tools, LWD tools, and others.

During drilling operations, the drill string 708 (perhaps including the Kelly 716, the drill pipe 718, and the bottom hole assembly 720) may be rotated by the rotary table 710. In addition to, or alternatively, the bottom hole assembly 720 may also be rotated by a motor (e.g., a mud motor) that may be located downhole. The drill collars 722 may be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and subsurface formations 714.

Drilling operations may utilize various surface equipment, such as a mud pump 732 or other types of surface equipment. The surface equipment may be outfitted with one or more sensors and one or more control devices. During drilling operations, the mud pump 732 may pump drilling fluid (sometimes known by those of ordinary skill in the art as "drilling mud") from a mud pit 734 through a hose 736 into the drill pipe 718 and down to the drill bit 726. In some implementations, one or more sensors may monitor one or more metrics of the pump drilling fluid (such as flow rate), and one or more control devices may control one or more operations of the mud pump 732 (such as opening and closing one or more valves or other mechanisms). The drilling fluid may flow out from the drill bit 726 and be returned to the surface 704 through an annular area 740 between the drill pipe 718 and the sides of the borehole 712. The drilling fluid may then be returned to the mud pit 734, where such fluid may be filtered. In some embodiments, the drilling fluid may be used to cool the drill bit 726, as well as to provide lubrication for the drill bit 726 during drilling operations. Additionally, the drilling fluid may be used to remove subsurface formation 714 cuttings created by operating the drill bit 726. It may be the images of these cuttings that many implementations operate to acquire and process.

Although some example well systems are shown in FIGS. 1 and 7, it is noted, however, that the well system with the well tools that perform integrity evaluation on nested well tubulars, which is described in FIGS. 1-7, can be used in any type of well system in the oil and gas industry. For example, the well systems may be any type of drilling well systems, completion well systems, and producing well systems.

Figure 8:
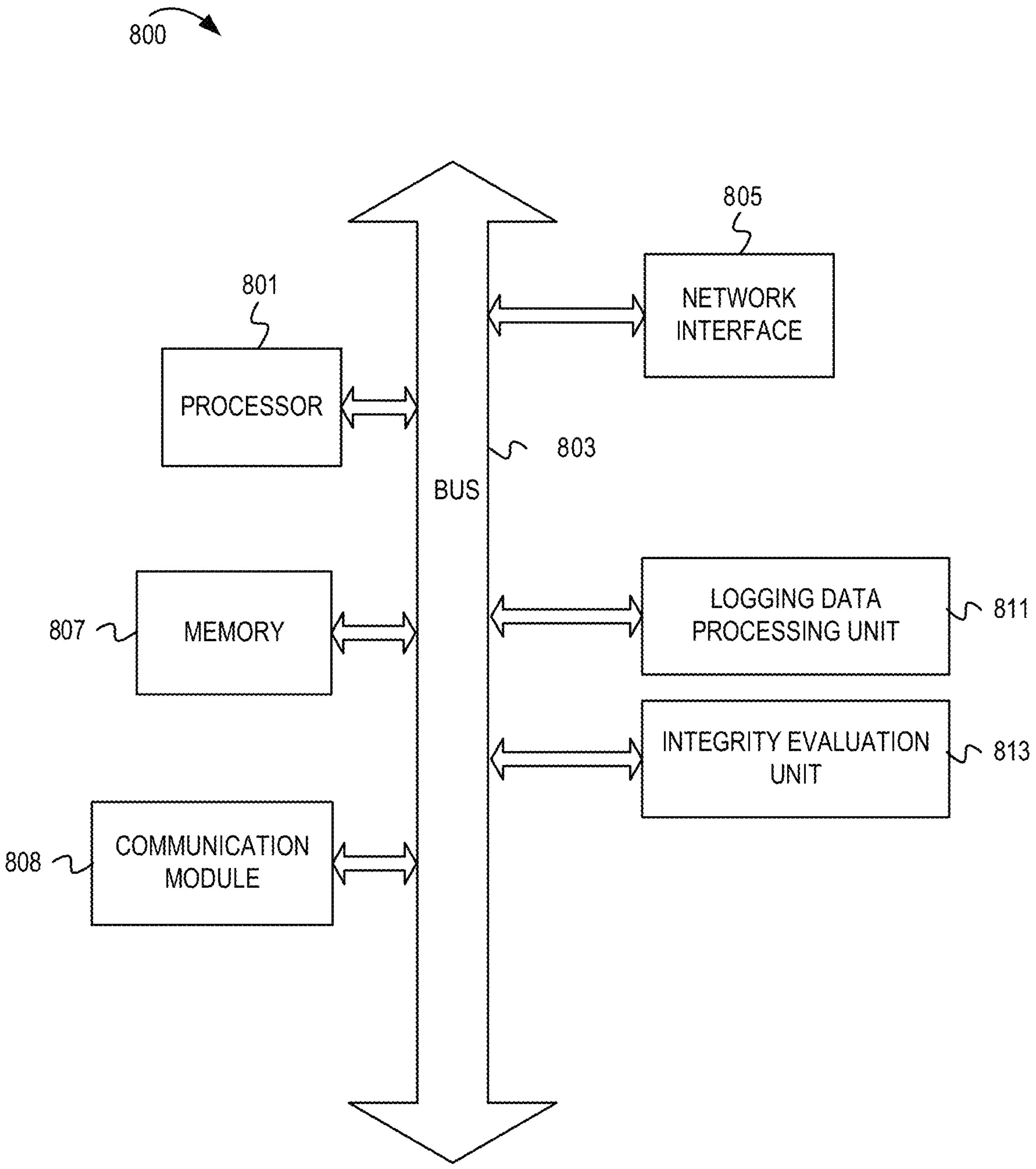
FIG. 8 depicts an example computer system that can be implemented in surface equipment of a well system for integrity evaluation of nested well tubulars.

FIG. 8 depicts an example computer system that can be implemented in surface equipment of a well system for integrity evaluation of nested well tubulars. The computer system 800 may be an example of a computer system that may be used during the operation of the well system. For example, the computer system 800 may be a standalone computer system (such as a workstation, laptop, or desktop) or may be integrated into other surface equipment of the well system. In some implementations, the computer system 800 may be communicatively coupled to one or more well tools that take integrity measurements (e.g., via a wireline or other mechanisms) in order to perform the integrity evaluation for the nested well tubulars of the well system, as described in FIGS. 1-7. The computer system 800 may include one or more processors 801 (possibly including multiple cores, multiple nodes, and/or implementing multi-threading, etc.). The computer system 800 may include memory 807. The memory 807 may be system memory or any type or implementation of machine or computer readable media having instructions that are executable by the one or more processors 801 to implement the operations described in FIGS. 1-7. The memory 807 may be system memory or any type or implementation of machine or computer readable and writable media having the ability to receive, process and/or store data from well devices and tools (including those described in FIGS. 1-7). The computer system 800 also may include a bus 803 and a network interface 805. The computer system 800 also may include a communications module 808 that may control wired and wireless communications, such as communicating with downhole devices or tools and communicating with other surface equipment. The computer system 800 also may include at least a logging data processing unit 811 and an integrity evaluation unit 813, among other processing units or modules that are used during the operation of the well system and the well tools described herein. For example, the logging data processing unit 811 may communicate with and work in conjunction with the well tools to take integrity measurements of the nested well tubulars, as described in FIGS. 1-7. The integrity evaluation unit 813 may work in conjunction with the logging data processing unit 811 to perform the integrity evaluation of the nested well tubulars and generate the results (such as the images showing the pipe thickness at different depts and azimuthal information), as described above in FIGS. 1-7. In some implementations, the integrity evaluation unit 813 may also recommend remedial actions based on the results of the integrity evaluation. The functionality described herein may be implemented with an application-specific integrated circuit, in logic implemented in the processor(s) 801, in a co-processor on a peripheral device or card, etc. Further, implementations may include fewer or additional components not illustrated in FIG. 8. The processor(s) 801 and the network interface 805 may be coupled to the bus 803. Although illustrated as being coupled to the bus 803, the memory 807 may be coupled to the processor(s) 801.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for integrity evaluation of nested well tubulars of a well system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Example Embodiments can include the following:

Embodiments #1: A method for integrity evaluation of one or more nested well tubulars of a well system, comprising: acquiring one or more non-azimuthal logs and one or more azimuthal logs for the one or more nested well tubulars; processing the one or more non-azimuthal logs to estimate at least one log of a circumferentially averaged attribute of the one or more nested well tubulars; processing the one or more azimuthal logs in conjunction with the at least one log of the circumferentially averaged attribute to obtain at least one log of a non-circumferentially averaged attribute of the one or more nested well tubulars; and determining the integrity of the one or more nested well tubulars based, at least in part, on the log of the non-circumferentially averaged attribute of the one or more nested well tubulars.

Embodiments #2: The method of Embodiments #1, wherein processing the one or more non-azimuthal logs to estimate the at least one log of the circumferentially averaged attribute of the one or more nested well tubulars includes running a model-based inversion or a supervised machine learning model.

Embodiments #3: The method of Embodiments #1, wherein the circumferentially averaged attribute includes at least one of a circumferentially averaged thickness of each of the one or more nested well tubulars, a circumferentially averaged metal loss of each of the one or more nested well tubulars, a circumferentially averaged magnetic permeability of each of the one or more nested well tubulars, a circumferentially averaged electrical conductivity of each of the one or more nested well tubulars, a cumulative thickness the one or more nested well tubulars, a cumulative metal loss of the one or more nested well tubulars, and an eccentricity between the one or more nested well tubulars.

Embodiments #4: The method of Embodiments #1, wherein processing the one or more azimuthal logs in conjunction with the at least one log of the circumferentially averaged attribute includes generating at least one scaled image, wherein the scaled image is a scaled version of the one or more azimuthal logs such that a circumferential average equivalent of the scaled image at a given depth matches the at least one log of the circumferentially averaged attribute at the given depth.

Embodiments #5: The method of Embodiments #4, wherein the circumferential average equivalent of the scaled image is computed as a weighted sum of pixels of the scaled image within a sliding window with an axial length proportional to a vertical resolution of a non-azimuthal tool that acquired the one or more non-azimuthal logs.

Embodiments #6: The method of Embodiments #4, wherein a scaling for the scaled image is a linear scaling, a polynomial scaling, or a non-linear scaling.

Embodiments #7: The method of Embodiments #4, wherein generating the scaled image includes performing an optimization operation to determine a contrast of each pixel of the scaled image.

Embodiments #8: The method of Embodiments #4, wherein the at least one log of the circumferentially averaged attribute includes a plurality of logs of the circumferentially averaged attribute for each of the one or more nested well tubulars, and wherein the plurality of logs of the circumferentially averaged attribute for each of the one or more nested well tubulars are used to obtain scaled images for each of the one or more nested well tubulars.

Embodiments #9: The method of Embodiments #4, wherein the one or more azimuthal logs include a plurality of azimuthal logs with different depth of investigation, and wherein the plurality of azimuthal logs with different depth of investigation are used for generating scaled images for each of the one or more nested well tubulars.

Embodiments #10: The method of Embodiments #1, further comprising depth aligning the one or more non-azimuthal logs and the one or more azimuthal logs.

Embodiments #11: The method of Embodiments #1, wherein the at least one log of the non-circumferentially averaged attributes is a quantitative two-dimensional image of one or more attributes of each of the one or more nested well tubulars.

Embodiments #12: The method of Embodiments #1, wherein acquiring the one or more non-azimuthal logs includes logging the well system with an eddy current tool with multiple depths of investigation, and acquiring the one or more azimuthal logs includes logging the well system with at least one of a multi-arm caliper tool, a multi-arm or scanning ultrasound sensor tool, a magnetic flux leakage tool, a partial saturation eddy current tool, and a multi-sensor or scanning eddy current tool.

Embodiments #13: The method of Embodiments #1, further comprising: determining a mapping function between the one or more azimuthal logs and the one or more non-azimuthal logs for the one or more nested well tubulars; acquiring one or more additional non-azimuthal logs for the one or more nested well tubulars; and estimating azimuthal information for the one or more nested well tubulars to combine with the one or more additional non-azimuthal logs based on the mapping function.

Embodiments #14: A well system, comprising: a non-azimuthal well tool configured to acquire one or more non-azimuthal logs for one or more nested well tubulars of the well system; an azimuthal well tool configured to acquire one or more azimuthal logs for the one or more nested well tubulars; one or more processors; and a computer-readable storage medium having instructions stored thereon that are executable by the one or more processors to cause the well system to: process the one or more non-azimuthal logs to estimate at least one log of a circumferentially averaged attribute of the one or more nested well tubulars; process the one or more azimuthal logs in conjunction with the at least one log of the circumferentially averaged attribute to obtain at least one log of a non-circumferentially averaged attribute of the one or more nested well tubulars; and determine the integrity of the one or more nested well tubulars based, at least in part, on the log of the non-circumferentially averaged attribute of the one or more nested well tubulars.

Embodiments #15: The well system of Embodiments #14, wherein the instructions that cause the well system to process the one or more azimuthal logs in conjunction with the at least one log of the circumferentially averaged attribute includes instructions that cause the well system to generate at least one scaled image, wherein the scaled image is a scaled version of the one or more azimuthal logs such that a circumferential average equivalent of the scaled image at a given depth matches the at least one log of the circumferentially averaged attribute at the given depth.

Embodiments #16: The well system of Embodiments #15, wherein the circumferential average equivalent of the scaled image is computed as a weighted sum of pixels of the scaled image within a sliding window with an axial length proportional to a vertical resolution of a non-azimuthal tool that acquired the one or more non-azimuthal logs.

Embodiments #17: The well system of Embodiments #14, further comprising instructions that cause the well system to depth align the one or more non-azimuthal logs and the one or more azimuthal logs.

Embodiments #18: A non-transitory computer-readable storage medium having instructions stored thereon that are executable by one or more processors of a well system, the instructions comprising: instructions for acquiring one or more non-azimuthal logs for one or more nested well tubulars; instructions for acquiring one or more azimuthal logs for the one or more nested well tubulars; instructions for processing the one or more non-azimuthal logs to estimate at least one log of a circumferentially averaged attribute of the one or more nested well tubulars; instructions for processing the one or more azimuthal logs in conjunction with the at least one log of the circumferentially averaged attribute to obtain at least one log of a non-circumferentially averaged attribute of the one or more nested well tubulars; and instructions for determining the integrity of the one or more nested well tubulars based, at least in part, on the log of the non-circumferentially averaged attribute of the one or more nested well tubulars.

Embodiments #19: The non-transitory computer-readable storage medium of Embodiments #18, wherein the instructions for processing the one or more azimuthal logs in conjunction with the at least one log of the circumferentially averaged attribute include: instructions for generating at least one scaled image, wherein the scaled image is a scaled version of the one or more azimuthal logs such that a circumferential average equivalent of the scaled image at a given depth matches the at least one log of the circumferentially averaged attribute at the given depth.

Embodiments #20: The non-transitory computer-readable storage medium of Embodiments #18, wherein the instructions further include: instructions for determining a mapping function between the one or more azimuthal logs and the one or more non-azimuthal logs for the one or more nested well tubulars; instructions for acquiring one or more additional non-azimuthal logs for the one or more nested well tubulars; and instructions for estimating azimuthal information for the one or more nested well tubulars to combine with the one or more additional non-azimuthal logs based on the mapping function.

What is claimed is:

1. A method for integrity evaluation of one or more nested well tubulars of a well system, comprising:

acquiring one or more non-azimuthal logs and one or more azimuthal logs for the one or more nested well tubulars;

processing the one or more non-azimuthal logs to estimate at least one log of a circumferentially averaged attribute of the one or more nested well tubulars;

processing the one or more azimuthal logs in conjunction with the at least one log of the circumferentially averaged attribute to obtain at least one log of a non-circumferentially averaged attribute of the one or more nested well tubulars; and determining the integrity of the one or more nested well tubulars based, at least in part, on the log of the non-circumferentially averaged attribute of the one or more nested well tubulars.

2. The method of claim 1, wherein processing the one or more non-azimuthal logs to estimate the at least one log of the circumferentially averaged attribute of the one or more nested well tubulars includes running a model-based inversion or a supervised machine learning model.

3. The method of claim 1, wherein the circumferentially averaged attribute includes at least one of a circumferentially averaged thickness of each of the one or more nested well tubulars, a circumferentially averaged metal loss of each of the one or more nested well tubulars, a circumferentially averaged magnetic permeability of each of the one or more nested well tubulars, a circumferentially averaged electrical conductivity of each of the one or more nested well tubulars, a cumulative thickness the one or more nested well tubulars, a cumulative metal loss of the one or more nested well tubulars, and an eccentricity between the one or more nested well tubulars.

4. The method of claim 1, wherein processing the one or more azimuthal logs in conjunction with the at least one log of the circumferentially averaged attribute includes generating at least one scaled image, wherein the scaled image is a scaled version of the one or more azimuthal logs such that a circumferential average equivalent of the scaled image at a given depth matches the at least one log of the circumferentially averaged attribute at the given depth.

5. The method of claim 4, wherein the circumferential average equivalent of the scaled image is computed as a weighted sum of pixels of the scaled image within a sliding window with an axial length proportional to a vertical resolution of a non-azimuthal tool that acquired the one or more non-azimuthal logs.

6. The method of claim 4, wherein a scaling for the scaled image is a linear scaling, a polynomial scaling, or a nonlinear scaling.

7. The method of claim 4, wherein generating the scaled image includes performing an optimization operation to determine a contrast of each pixel of the scaled image.

8. The method of claim 4, wherein the at least one log of the circumferentially averaged attribute includes a plurality of logs of the circumferentially averaged attribute for each of the one or more nested well tubulars, and wherein the plurality of logs of the circumferentially averaged attribute for each of the one or more nested well tubulars are used to obtain scaled images for each of the one or more nested well tubulars.

9. The method of claim 4, wherein the one or more azimuthal logs include a plurality of azimuthal logs with different depth of investigation, and wherein the plurality of azimuthal logs with different depth of investigation are used for generating scaled images for each of the one or more nested well tubulars.

10. The method of claim 1, further comprising depth aligning the one or more non-azimuthal logs and the one or more azimuthal logs.

11. The method of claim 1, wherein the at least one log of the non-circumferentially averaged attributes is a quantitative two-dimensional image of one or more attributes of each of the one or more nested well tubulars.

12. The method of claim 1, wherein acquiring the one or more non-azimuthal logs includes logging the well system with an eddy current tool with multiple depths of investigation, and acquiring the one or more azimuthal logs includes logging the well system with at least one of a multi-arm caliper tool, a multi-arm or scanning ultrasound sensor tool, a magnetic flux leakage tool, a partial saturation eddy current tool, and a multi-sensor or scanning eddy current tool.

13. The method of claim 1, further comprising:

determining a mapping function between the one or more azimuthal logs and the one or more non-azimuthal logs for the one or more nested well tubulars;

acquiring one or more additional non-azimuthal logs for the one or more nested well tubulars; and estimating azimuthal information for the one or more nested well tubulars to combine with the one or more additional non-azimuthal logs based on the mapping function.

14. A well system, comprising:

a non-azimuthal well tool configured to acquire one or more non-azimuthal logs for one or more nested well tubulars of the well system;

an azimuthal well tool configured to acquire one or more azimuthal logs for the one or more nested well tubulars;

one or more processors; and a non-transitory computer-readable storage medium having instructions stored thereon that are executable by the one or more processors to cause the well system to:

process the one or more non-azimuthal logs to estimate at least one log of a circumferentially averaged attribute of the one or more nested well tubulars;

process the one or more azimuthal logs in conjunction with the at least one log of the circumferentially averaged attribute to obtain at least one log of a non-circumferentially averaged attribute of the one or more nested well tubulars; and determine an integrity of the one or more nested well tubulars based, at least in part, on the log of the non-circumferentially averaged attribute of the one or more nested well tubulars.

15. The well system of claim 14, wherein the instructions that cause the well system to process the one or more azimuthal logs in conjunction with the at least one log of the circumferentially averaged attribute includes instructions that cause the well system to generate at least one scaled image, wherein the scaled image is a scaled version of the one or more azimuthal logs such that a circumferential average equivalent of the scaled image at a given depth matches the at least one log of the circumferentially averaged attribute at the given depth.

16. The well system of claim 15, wherein the circumferential average equivalent of the scaled image is computed as a weighted sum of pixels of the scaled image within a sliding window with an axial length proportional to a vertical resolution of a non-azimuthal tool that acquired the one or more non-azimuthal logs.

17. The well system of claim 14, further comprising instructions that cause the well system to depth align the one or more non-azimuthal logs and the one or more azimuthal logs.

18. A non-transitory computer-readable storage medium having instructions stored thereon that are executable by one or more processors of a well system, the instructions comprising:

instructions for acquiring one or more non-azimuthal logs for one or more nested well tubulars;

instructions for acquiring one or more azimuthal logs for the one or more nested well tubulars;

instructions for processing the one or more non-azimuthal logs to estimate at least one log of a circumferentially averaged attribute of the one or more nested well tubulars;

instructions for processing the one or more azimuthal logs in conjunction with the at least one log of the circumferentially averaged attribute to obtain at least one log of a non-circumferentially averaged attribute of the one or more nested well tubulars; and instructions for determining an integrity of the one or more nested well tubulars based, at least in part, on the log of the non-circumferentially averaged attribute of the one or more nested well tubulars.

19. The non-transitory computer-readable storage medium of claim 18, wherein the instructions for processing the one or more azimuthal logs in conjunction with the at least one log of the circumferentially averaged attribute include:

instructions for generating at least one scaled image, wherein the scaled image is a scaled version of the one or more azimuthal logs such that a circumferential average equivalent of the scaled image at a given depth matches the at least one log of the circumferentially averaged attribute at the given depth.

20. The non-transitory computer-readable storage medium of claim 18, wherein the instructions further include:

instructions for determining a mapping function between the one or more azimuthal logs and the one or more non-azimuthal logs for the one or more nested well tubulars;

instructions for acquiring one or more additional non-azimuthal logs for the one or more nested well tubulars; and instructions for estimating azimuthal information for the one or more nested well tubulars to combine with the one or more additional non-azimuthal logs based on the mapping function.

* * * * *